2,834,763

United States Patent Office

Patented May 13, 1958

2,834,763

COPOLYMERS OF TRIFLUOROETHYL ACRYLATE

Benjamin D. Halpern, Wolf Karo, and Philip Levine, Leominster, Mass., assignors, by mesne assignments, to The Borden Company, New York, N. Y., a corporation of New Jersey No Drawing. Application October 29, 1954
Serial No. 465,725

7 Claims. (Cl. 260—85.5)

This invention relates to new fluorinated addition polymers. It relates more particularly to new addition copolymers of trifluoroethyl acrylate having excellent characteristics as rubbers and as heat-resistant interlayers for safety glass.

In accordance with this invention trifluoroethyl acrylate is homopolymerized or copolymerized with acrylamides or acrylonitriles to provide elastomeric materials having low swell in water and organic liquids, low solubility in water and organic liquids, high temperature resistance, and rubbery characteristics over a wide temperature range. Especially useful materials are obtained where there is at least 88% by weight of trifluoroethylacrylate in the copolymers.

The preferred co-monomers of this invention include acrylamide, acrylonitrile, N-tert-butylacrylamide, N-n-butylacrylamide, N-iso-butylacrylamide, methacrylamide, N-methylacrylamide, N-iso-propylacrylamide and N,N-diethylacrylamide, but substituted acrylonitriles and other alkyl acrylamides may be used.

The preparation of trifluoroethyl acrylate is carried out by reacting trifluoroethanol (B. P. 74.05° C. $d_{22°}$ 1.3739 g./ml.) with acrylyl chloride in the presence of triethylamine. The physical properties of trifluoroethyl acrylate are as follows:

B. P. _____ ° C__ 91–92
$n_D^{25}$ _____ 1.3475

Acrylamide, alkyl-substituted acrylamides, acrylonitrile and substituted acrylonitriles are well known and have been previously described. The structural formulas for trifluoroethyl acrylate and the preferred co-monomers are given below:

$$CF_3-CH_2-O-CO-CH=CH_2$$
Trifluoroethyl acrylate $$CH_2=CH-CO-NH_2$$
Acrylamide $$CH_2=CH-C\equiv N$$
Acrylonitrile $$CH_2=CH-CO-N(C_2H_5)_2$$
N,N-diethylacrylamide $$CH_2=CH-CO-NH-CH_2-CH_2-CH_2-CH_3$$
N-n-butylacrylamide $$CH_2=CH-CO-NH-CH_2-CH(CH_3)_2$$
N-isobutylacrylamide $$CH_2=CH-CO-NH-CH(CH_3)_2$$
N-isopropylacrylamide $$CH_2=CH-CO-NH-C(CH_3)_3$$
N-tert-butylacrylamide The polymerisation may be carried out by the bulk, suspension or emulsion techniques. It is preferred, however, to carry out the polymerisation in bulk or suspension.

The following polymerisation was carried out by bulk technique:

Example 1

95 parts trifluoroethyl acrylate
5 parts acrylonitrile
0.1 part benzoyl peroxide The mixture waes placed in a tube, flushed with nitrogen, sealed, and heated for 2½ days at 65° C. and then 8 hours at 100° C. About 90 percent conversion was obtained and the products were colorless, clear, highly transparent, bubble free rubbers.

In particular the unvulcanized products of Example 1 when used as interlayers for safety glass resulted in a much more light and discoloration resistant glass than heretofore described.

Where 100 parts of the polymer of Example 1 was compounded on a rubber mill with 1 part of sulfur, 35 parts of high abrasion furnace black, 1 part of paraffin and 0.75 to 1 part of triethyl tetramine ("Teta") and then cured at 320° F. for 30 minutes, the following properties were noted:

|  | 1 "Teta" | 0.75 "Teta" |
|---|---|---|
| Orig. Tensile strength, lbs./in | 1,640 | 1,760 |
| Orig. Percent Elongation | 229 | 302 |
| Orig. Shore A hardness | 66 | 56 |
| Tensile after 70 hrs. in or at 350° F | 1,451 | 1,401 |
| Tensile after 100 hours in Esso Turbo Oil 15 at 350° F | 1,775 | 1,424 |
| Tensile after 250 hours in Esso Turbo Oil 15 at 350° F | 1,590 | 1,694 |

From this data it appears that the compounded polymer has exceptional resistance to oils and heat.

As another example of this invention trifluoroethyl acrylate was copolymerized with N-tert-butylacrylamide in suspension as follows:

Example 2

Into a continually stirred vessel containing one gram of soluble starch dissolved in 400 cc. of distilled water was added a mixture of 95 grams of trifluoroethyl acrylate, 5 grams N-tert-butylacrylamide and 0.1 gram of dibenzoyl peroxide. The mixture was heated to 80° C. at which temperature the reaction becomes self-sustaining. When the reaction had gone to completion the mixture was heated to reflux and the excess monomer removed by steam distillation. After the mixture had cooled, the copolymer appeared as a precipitate which was removed by filtration and washed with hot water. A yield of about 89 grams of copolymer was obtained.

The resultant product was rubbery, could be compounded with ordinary fillers and softeners, and was vulcanizable with amine bases and sulfur in a similar manner to Example 1. Both the vulcanized and unvulcanized products had low swell and very low solubility in water and organic liquids.

The following examples were done in sealed tubes:

Example 3

88 parts trifluoroethyl acrylate
12 parts acrylonitrile
0.01 part benzoyl peroxide This mixture was treated in the same manner as Example 1 and yielded a harder copolymer product, but otherwise similar to Example 1.

Example 4

95 parts trifluoroethyl acrylate
5 parts N-isopropylacrylamide
.01 part of either lauryl peroxide or alpha,alpha-azodiisobutyronitrile This mixture was placed in a tube, flushed with nitrogen, sealed and heated for three days at 50–55° C. to give about 90 percent conversion to polymer. The physical properties of the product were similar to those of Example 1.

*Example 5*

95 parts trifluoroethyl acrylate
5 parts N, N-diethylacrylamide
.01 part of either lauryl peroxide or alpha,alpha-azodiisobutyronitrile The reaction conditions and physical properties of the product were similar to those of Example 4.

In a similar manner to Example 4, homopolymers of trifluoroethyl acrylate, copolymers of trifluoroethyl acrylate with acrylamide (5%), acrylamide (10%), N-n-butylacrylamide (5%), N-methylacrylamide (5%), and N-isobutylacrylamide (5%) were made.

When any of the products of these examples was soaked in lubricating oil was found to have less pick-up or swell than butadiene-acrylonitrile copolymers, the type often referred to as "oil-resistant."

The products of this invention were found to be especially suitable as interlayers for safety glass, having excellent transparency and being resistant to discoloration at high temperatures.

In addition to single monomers copolymerized with trifluoroethyl acrylate, hetero polymers of trifluoroethyl acrylate with acrylamides, methacrylamides and acrylonitrile were found to have high oil and solvent resistance, flexibility over a wide temperature range, and excellent transparency.

The term polymer when used herein includes homopolymers and hetero-polymers, where "hetero-polymers" indicates that one or more different co-monomers may be copolymerized with the base monomer.

We claim:

1. Addition copolymers of at least 88% by weight of trifluoroethyl acrylate with a member of the group consisting of acrylonitrile, acrylamide, and N-alkyl substituted acrylamide.

2. Addition copolymers of at least 88% by weight of trifluoroethyl acrylate and N-tertiary butylacrylamide.

3. Addition copolymers of at least 88% by weight of trifluoroethyl acrylate and acrylonitrile.

4. Addition copolymers of at least 88% by weight of trifluoroethyl acrylate and N-isopropylacrylamide.

5. Addition copolymers of at least 88% by weight of trifluoroethyl acrylate and N,N-diethlacrylamide.

6. Vulcanized rubbery polymer containing an addition copolymer of at least 88% by weight of trifluoroethyl acrylate with a member of the group consisting of acrylonitrile, acrylamide, and N-alkyl substituted acrylamide and prepared by curing the unvulcanized polymer in the presence of sulfur and an amine base.

7. Vulcanized rubbery polymer containing an addition copolymer of at least 88% by weight of trifluoroethyl acrylate with acrylonitrile ad prepared by curing the unvulcanized polymer in the presence of sulfur and an amine base.

References Cited in the file of this patent

UNITED STATES PATENTS

| | | |
|---|---|---|
| 2,628,958 | Bittles | Feb. 17, 1953 |
| 2,642,416 | Ahlbrecht et al. | June 16, 1953 |

FOREIGN PATENTS

| | | |
|---|---|---|
| 580,665 | Great Britain | Sept. 16, 1946 |